(12) United States Patent
Shirai et al.

(10) Patent No.: US 6,567,039 B2
(45) Date of Patent: May 20, 2003

(54) ROAD-SHAPE RECOGNITION SYSTEM

(75) Inventors: Noriaki Shirai, Kariya (JP); Katsuhiro Morikawa, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/841,006

(22) Filed: Apr. 25, 2001

(65) Prior Publication Data

US 2002/0044080 A1 Apr. 18, 2002

(30) Foreign Application Priority Data

May 25, 2000 (JP) .................................... 2000-154921

(51) Int. Cl.[7] .......................... G01S 13/93; G01S 13/00; G01S 15/93
(52) U.S. Cl. .......................... 342/70; 367/87; 180/167; 180/168; 180/169; 342/195
(58) Field of Search .............. 342/5, 6, 7, 8, 342/10, 70, 71, 72, 175, 195, 33, 34, 35, 36, 41, 27, 28; 180/167, 168, 169, 204; 340/436; 367/87, 89, 90, 91, 92, 93, 94–116

(56) References Cited

U.S. PATENT DOCUMENTS

| 2,432,984 A | * | 12/1947 | Budenbom | 342/6 |
|---|---|---|---|---|
| 2,461,005 A | * | 2/1949 | Southworth | 342/6 |
| 2,502,974 A | * | 4/1950 | McElhannon | 342/33 |
| 3,716,855 A | * | 2/1973 | Asam | 342/33 |
| 4,069,888 A | * | 1/1978 | Wolters et al. | 180/169 |
| 6,300,865 B1 | * | 10/2001 | Fechner et al. | 340/436 |

FOREIGN PATENT DOCUMENTS

| JP | 6-68398 A | 3/1994 |
|---|---|---|
| JP | 8-249598 A | 9/1996 |
| JP | 10-239436 A | 9/1998 |

* cited by examiner

Primary Examiner—Bernarr E. Gregory
(74) Attorney, Agent, or Firm—Posz & Bethards, PLC

(57) ABSTRACT

A radar device operates for emitting a detection wave ahead of a vehicle, and detecting objects in response to echoes of the emitted detection wave. A reflector detecting device operates for detecting reflectors among the objects detected by the radar device. The detected reflectors are located along a road. A reflector-row extracting device operates for, in cases where there are a plurality of rows of the reflectors detected by the reflector detecting device in one side of the vehicle, extracting one from among the reflector rows. A road-shape recognizing device operates for recognizing a shape of the road on the basis of the reflector row extracted by the reflector-row extracting device.

11 Claims, 9 Drawing Sheets

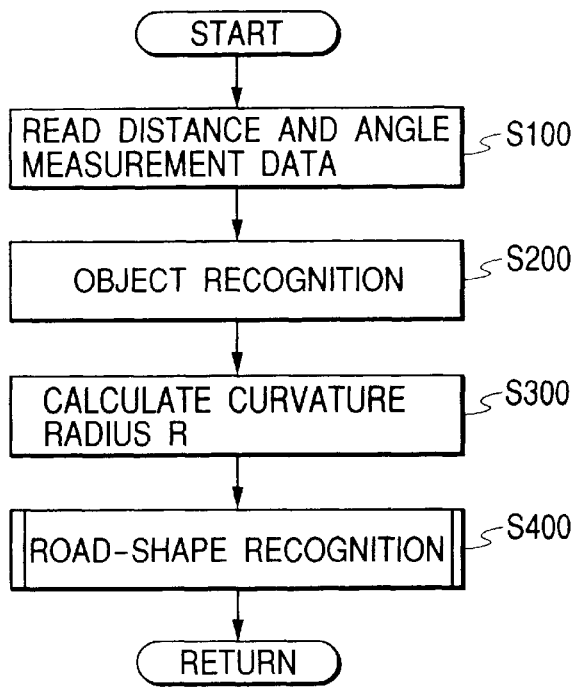
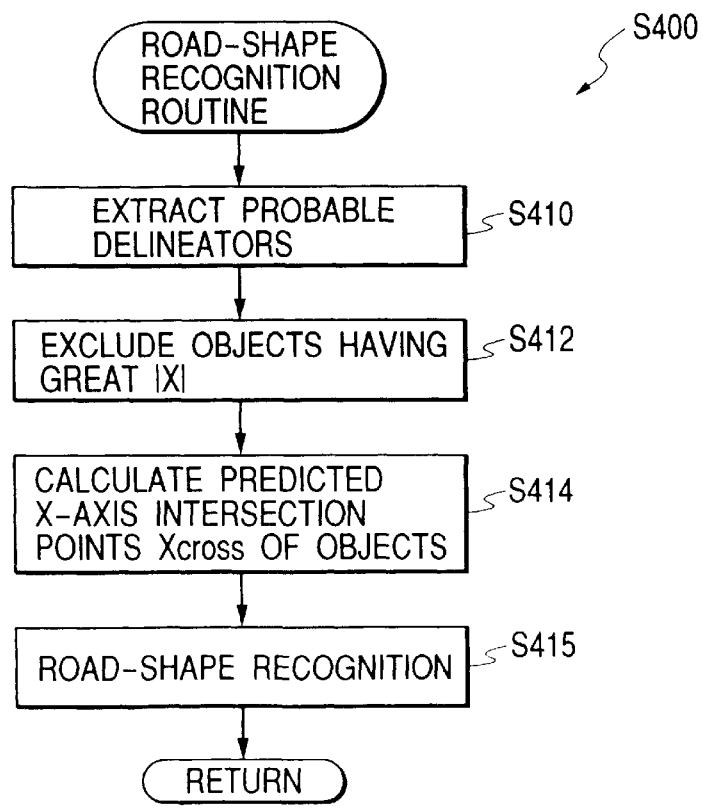

ROAD-SHAPE RECOGNITION SYSTEM

BACKGROUND OF THE INVENTION

1. Field of the Invention

This invention relates to an apparatus for recognizing the shape of a road which can be mounted on, for example, a vehicle. In addition, this invention relates to an on-vehicle apparatus for detecting a preceding vehicle. Furthermore, this invention relates to a recording medium which stores a computer program for recognizing the shape of a road.

2. Description of the Related Art

There is an on-vehicle apparatus for controlling the present vehicle to automatically maintain the distance between the present vehicle and a preceding vehicle in a safe range. In general, such an inter-vehicle distance control apparatus contains a radar device for measuring the distance to a preceding vehicle from the present vehicle and the speed of the preceding vehicle relative to the present vehicle. In the inter-vehicle distance control apparatus, an objective preceding vehicle for inter-vehicle distance control is selected from among candidate preceding vehicles detected via the radar device. It is desirable to accurately determine an objective preceding vehicle even when the present vehicle is traveling along a curved road. The recognition of a road shape is effective in accurate determination of an objective preceding vehicle.

Japanese patent application publication number 8-249598 discloses an on-vehicle apparatus for sensing delineators and recognizing a road shape from information about the sensed delineators. The apparatus in Japanese application 8-249598 emits a forward electromagnetic wave beam from the body of the vehicle, and controls the forward electromagnetic wave beam to periodically scan a given angular region (a detection area) in front of the body of the vehicle. In the case where an object exists in the given angular region (the detection area), the forward electromagnetic wave beam encounters the object before being at least partially reflected thereby. A portion of the reflected electromagnetic wave beam returns to the apparatus as an echo electromagnetic wave beam. The apparatus detects the object in response to the echo electromagnetic wave beam. Specifically, the apparatus calculates the distance to the object from the time interval between the moment of emission of the forward electromagnetic wave beam and the moment of reception of the related echo electromagnetic wave beam. In addition, the apparatus calculates the direction of the object relative to the vehicle.

The apparatus in Japanese application 8-249598 decides whether each detected object is a delineator on a right-hand road side or a delineator on a left-hand road side in response to the horizontal variation in the position of the object relative to the vehicle. Decided delineators on a right-hand road side are linked by lines, and the set of the lines is recognized as a right-hand road edge. Similarly, decided delineators on a left-hand road side are linked by lines, and the set of the lines is recognized as a left-hand road edge. The apparatus in Japanese application 8-249598 has a chance of erroneously detecting road edges in the case where the vehicle is traveling along a road provided with three or more rows of cat's-eyes.

Japanese patent application publication number 10-239436 discloses an apparatus for detecting the vehicle-to-vehicle distance. The apparatus in Japanese application 10-239436 emits a forward laser beam, and controls the forward laser beam to periodically scan a given angular region in front of the body of the present vehicle. The apparatus in Japanese application 10-239436 detects objects in the given angular range from return laser beams coming therefrom. Specifically, the apparatus detects the positions of the objects relative to the present vehicle. In more detail, the apparatus detects the distances to the objects and the directions (the angular positions) of the objects relative to the present vehicle. The detected objects include reflectors on the right-hand and left-hand sides of the road. In the apparatus of Japanese application 10-239436, the shape of the road is recognized from the loci (trajectories) of detected reflectors on the road sides. In addition, the range of the lane along which the present vehicle is traveling is calculated on the basis of the recognized road shape. Furthermore, a preceding vehicle is detected on the basis of the object positions relative to the present vehicle and the calculated range of the lane.

Japanese patent application publication number 6-68398 discloses an on-vehicle apparatus for detecting a road. The apparatus in Japanese application 6-68398 includes a radar device for emitting a forward electromagnetic wave beam, and controls the forward electromagnetic wave beam to periodically scan a given angular region in front of the body of the present vehicle. The radar device detects objects in the given angular range from return electromagnetic wave beams coming therefrom. Specifically, the radar device detects the positions of the objects relative to the present vehicle. The detected objects include reflectors on the right-hand and left-hand sides of the road, and reflectors on preceding vehicles. The apparatus of Japanese application 6-68398 estimates the shape of the road from at least one of 1) the positions of detected reflectors relative to the present vehicle and 2) the horizontal variations in the positions of the detected reflectors.

SUMMARY OF THE INVENTION

It is a first object of this invention to provide an improved apparatus for recognizing the shape of a road.

It is a second object of this invention to provide an improved on-vehicle apparatus for detecting a preceding vehicle.

It is a third object of this invention to provide a recording medium which stores an improved computer program for recognizing the shape of a road.

A first aspect of this invention provides a road-shape recognition apparatus comprising a radar device for emitting a detection wave ahead of a vehicle, and detecting objects in response to echoes of the emitted detection wave; reflector detecting means for detecting reflectors among the objects detected by the radar device, the reflectors being located along a road; reflector-row extracting means for, in cases where there are a plurality of rows of the reflectors detected by the reflector detecting means in one side of the vehicle, extracting one from among the reflector rows; and road-shape recognizing means for recognizing a shape of the road on the basis of the reflector row extracted by the reflector-row extracting means.

A second aspect of this invention is based on the first aspect thereof, and provides a road-shape recognition apparatus wherein the reflector-row extracting means comprises means for extracting one, which exists in a specified region with respect to the vehicle in a width-wise direction of the vehicle, from among the reflector rows.

A third aspect of this invention is based on the second aspect thereof, and provides a road-shape recognition apparatus wherein the reflector-row extracting means comprises means for setting the specified region in accordance with a width of a lane along which the vehicle is traveling.

A fourth aspect of this invention is based on the second aspect thereof, and provides a road-shape recognition apparatus wherein the reflector-row extracting means comprises position estimating means for estimating positions, in the width-wise direction of the vehicle, of the reflectors detected by the reflector detecting means which occur after a lapse of an arbitrary time; minimum position detecting means for detecting, among the positions estimated by the position estimating means, a minimum position corresponding to a position nearest to the vehicle; and means for setting the specified region on the basis of the minimum position detected by the minimum position detecting means.

A fifth aspect of this invention is based on the second aspect thereof, and provides a road-shape recognition apparatus wherein the reflector-row extracting means comprises position estimating means for estimating positions, in the width-wise direction of the vehicle, of the reflectors detected by the reflector detecting means which occur after a lapse of an arbitrary time; determining means for determining whether or not there are a plurality of the positions estimated by the position estimating means; lane-width calculating means for, in cases where the determining means determines that there are a plurality of the positions estimated by the position estimating means, calculating a lane width on the basis of an interval between the estimated positions; and means for setting the specified region on the basis of the lane width calculated by the lane-width calculating means.

A sixth aspect of this invention is based on the first aspect thereof, and provides a road-shape recognition apparatus further comprising at least one of 1) a steering sensor for detecting a steering angle of the vehicle and 2) a yaw rate sensor for detecting a yaw rate of the vehicle; curvature-radius calculating means for calculating a curvature radius of a course, along which the vehicle is traveling, from at least one of 1) the steering angle detected by the steering sensor and 2) the yaw rate detected by the yaw rate sensor; position converting means for converting positions, in a width-wise direction of the vehicle, of the reflectors detected by the reflector detecting means into positions in the width-wise direction of the vehicle which occur on the assumption that the vehicle is traveling along a straight road; and means provided in the reflector-row extracting means for extracting one, which exists in a specified region with respect to the vehicle in the width-wise direction of the vehicle, from among the reflector rows in response to the positions resulting from the conversion by the position converting means.

A seventh aspect of this invention is based on the fourth aspect thereof, and provides a road-shape recognition apparatus wherein the road-shape recognizing means comprises means for recognizing the shape of the road on the basis of the reflector row extracted by the reflector-row extracting means and the positions estimated by the position estimating means.

An eighth aspect of this invention is based on the fourth aspect thereof, and provides a road-shape recognition apparatus wherein the position estimating means comprises means for estimating the positions, in the width-wise direction of the vehicle, of the reflectors detected by the reflector detecting means which occur after the lapse of the arbitrary time on the basis of relative speeds between the vehicle and the reflectors detected by the reflector detecting means.

A ninth aspect of this invention is based on the first aspect thereof, and provides a road-shape recognition apparatus wherein the reflector detecting means comprises means for detecting the reflectors among the objects detected by the radar device on the basis of relative speeds between the vehicle and the objects and sizes of the objects.

A tenth aspect of this invention provides a recording medium storing a computer program for road-shape recognition which comprises the steps of detecting reflectors among detected objects, the reflectors being located along a road; in cases where there are a plurality of rows of the detected reflectors in one side of a vehicle, extracting one from among the reflector rows; and recognizing a shape of the road on the basis of the extracted reflector row.

An eleventh aspect of this invention provides a preceding-vehicle detection apparatus for a subject vehicle. The apparatus comprises the road-shape recognition apparatus of the first aspect of this invention; relative position detecting means for detecting positions of the objects detected by the radar device relative to the subject vehicle; lane-sameness probability calculating means for calculating a probability for each of the objects that the object and the subject vehicle are on a same lane on the basis of the road shape recognized by the road-shape recognizing means and the relative position detected by the relative position detecting means; and preceding-vehicle detecting means for detecting a preceding vehicle with respect to the subject vehicle among the objects in response to the probabilities calculated by the lane-sameness probability calculating means.

BRIEF DESCRIPTION OF THE DRAWINGS

FIG. 5 is a flowchart of a segment of a program for the computer in FIG. 3.

FIG. 6 is a flowchart of a block in FIG. 5.

DETAILED DESCRIPTION OF THE INVENTION

A prior-art apparatus will be explained below for a better understanding of this invention.

Figure 1:
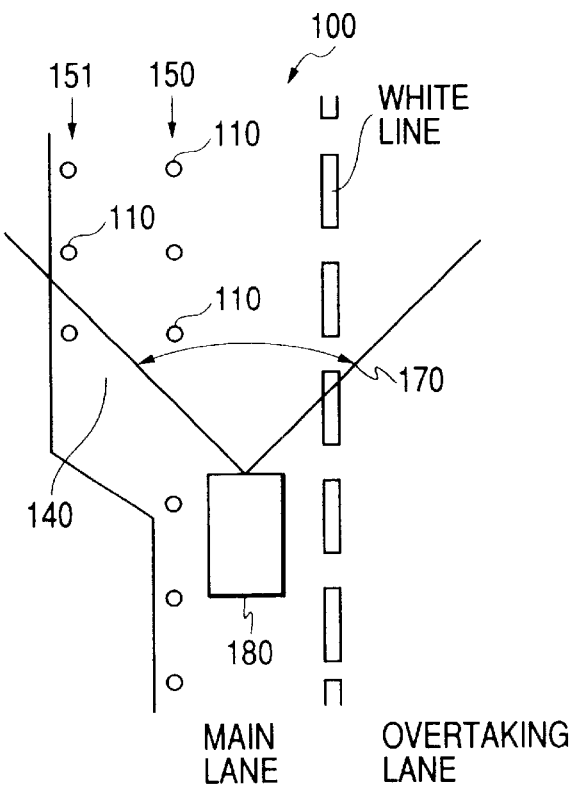
FIG. 1 is a diagram of a first example of a road, reflector rows (delineator rows), and a vehicle on which a prior-art apparatus is mounted.

FIG. 1 shows a road 100 having a left-hand edge pit lane 140 for a bus stop which branches off a main left-hand lane.

A vehicle 180 is traveling along the main left-hand lane of the road 100 (this traffic situation is normal in Japan). There are a left-hand non-edge row 150 of reflectors 110 and also a left-hand edge row 151 of reflectors 110 in the left-hand side of the road 100. The left-hand non-edge row 150 of reflectors 110 indicates the boundary between the pit lane 140 and the main left-hand lane. The reflectors 110 are cat's-eyes or delineators.

In the case where a prior-art apparatus of Japanese patent application publication number 8-249598 is mounted on the vehicle 180 of FIG. 1, a detection area (a given object-detectable angular region) 170 provided by the prior-art apparatus extends in front of the vehicle 180. The prior-art apparatus detects each reflector 110 in the detection area 170, and decides whether the detected reflector 110 is on a right-hand road side or a left-hand road side. Since the prior-art apparatus responds to the result of the decision about each detected reflector 110, it is difficult to discriminate the reflector rows 150 and 151 from each other. Accordingly, in this case, it is difficult for the prior-art apparatus to accurately detect the left-hand road edge and the left-hand edge of the lane along which the vehicle 180 is traveling.

Figure 2:
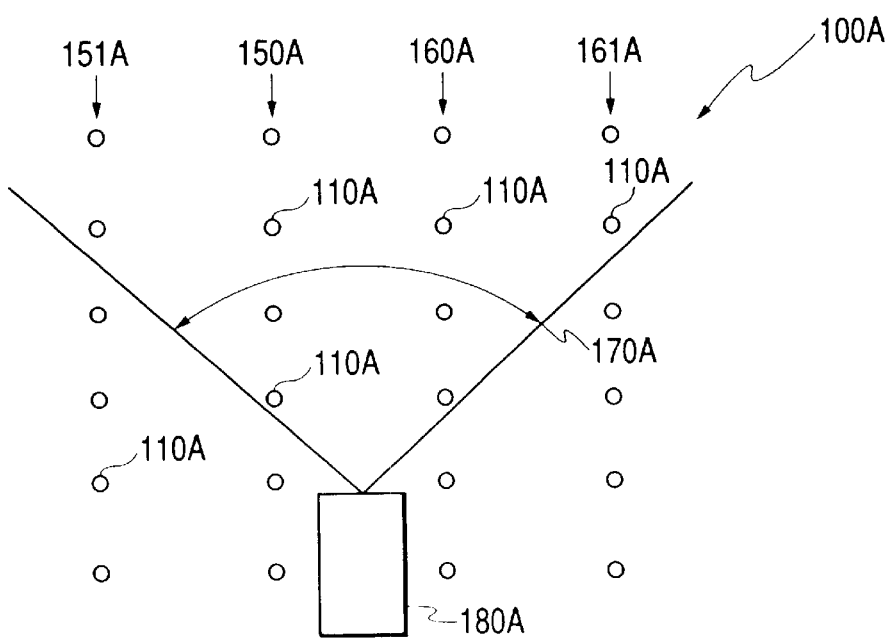
FIG. 2 is a diagram of a second example of a road, reflector rows (delineator rows), and a vehicle on which the prior-art apparatus is mounted.

FIG. 2 shows a road 100A having rows 150A, 151A, 160A, and 161A of reflectors 110A which indicate the boundaries between lanes. The reflectors 100A are cat's-eyes or delineators. A vehicle 180A is traveling along the lane between the reflector rows 150A and 160A.

In the case where a prior-art apparatus of Japanese patent application publication number 8-249598 is mounted on the vehicle 180A of FIG. 2, a detection area (a given object-detectable angular region) 170A provided by the prior-art apparatus extends in front of the vehicle 180A. The prior-art apparatus detects each reflector 110A in the detection area 170A, and decides whether the detected reflector 110A is on a right-hand road side or a left-hand road side. Since the prior-art apparatus responds to the result of the decision about each detected reflector 110A, it is difficult to discriminate the reflector rows 150A and 151A from each other, and to discriminate the reflector rows 160A and 161A from each other. Accordingly, in this case, it is difficult for the prior-art apparatus to accurately detect the left-hand and right-hand road edges, and the left-hand and right-hand edges of the lane along which the vehicle 180A is traveling.

First Embodiment

Figure 3:
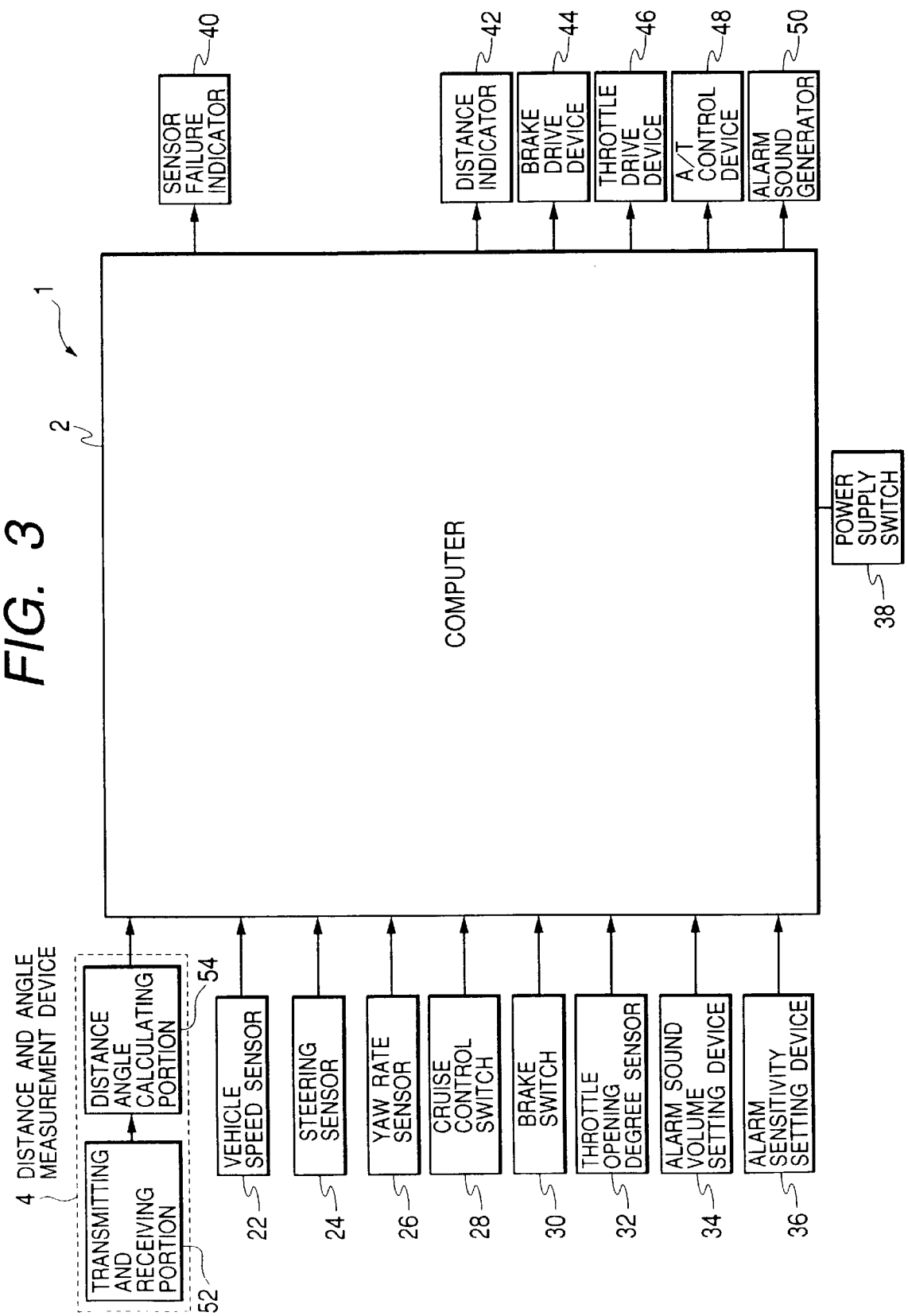
FIG. 3 is a block diagram of an inter-vehicle distance control apparatus including a road-shape recognition apparatus, a preceding-vehicle detection apparatus, and a recording medium according to a first embodiment of this invention.

FIG. 3 shows an inter-vehicle distance control apparatus 1 according to a first embodiment of this invention. The inter-vehicle distance control apparatus 1 is mounted on a vehicle. The inter-vehicle distance control apparatus 1 includes a road-shape recognition apparatus, a preceding-vehicle detection apparatus, and a recording medium.

As shown in FIG. 3, the inter-vehicle distance control apparatus 1 includes a computer (for example, a microcomputer) 2. The computer 2 has a combination of an input/output (I/O) interface, a CPU, a ROM, and a RAM. The computer 2 operates in accordance with a program stored in the ROM. The program may be stored in the RAM. In this case, the RAM is provided with a backup device.

Alternatively, the program may be stored in a recording medium such as a floppy disk, a magneto-optical disk, a CD-ROM, a DVD-ROM, or a hard disk. In this case, the computer 2 is connected with a drive for the recording medium, and the program is downloaded into the computer 2 through the drive.

The inter-vehicle distance control apparatus 1 includes a distance and angle measurement device 4, a vehicle speed sensor 22, a steering sensor 24, a yaw rate sensor 26, a cruise control switch 28, a brake switch 30, a throttle opening degree sensor (a throttle position sensor) 32, an alarm sound volume setting device 34, and an alarm sensitivity setting device 36 which are connected to the computer 2. The output signals of the devices 4, 22, 24, 26, 28, 30, 32, 34, and 36 are inputted into the computer 2.

The inter-vehicle distance control apparatus 1 includes a sensor failure indicator 40, a distance indicator 42, a brake drive device 44, a throttle drive device 46, an automotive automatic transmission control device 48, and an alarm sound generator 50 which are connected to the computer 2. The computer 2 outputs drive signals to the devices 40, 42, 44, 46, 48, and 50.

The inter-vehicle distance control apparatus 1 includes a power supply switch 38 connected to the computer 2. When the power supply switch 38 is changed to its on position, the computer 2 is powered and starts predetermined processes. The computer 2 is designed to implement inter-vehicle distance control. In addition, the computer 2 is designed to implement vehicle cruise control when an objective preceding vehicle is nonselected. According to the cruise control, the speed of the present vehicle is maintained at a setting value.

The distance and angle measurement device 4 corresponds to a radar device. The distance and angle measurement device 4 has a transmitting and receiving portion 52, and a distance and angle calculating portion 54. The transmitting and receiving portion 52 emits a forward laser beam ahead of the present vehicle, and controls the forward laser beam to periodically scan a given angular region in front of the present vehicle. The given angular region corresponds to a given sectorial detection area monitored by the transmitting and receiving portion 52. In the case where an object exists in the detection area (the given angular region), the forward laser beam encounters the object before being at least partially reflected thereby. A portion of the reflected laser beam returns to the transmitting and receiving portion 52 as an echo laser beam. The transmitting and receiving portion 52 receives the echo laser beam, and converts the echo laser beam into a corresponding electric signal. The transmitting and receiving portion 52 outputs the electric signal to the distance and angle calculating portion 54. The distance and angle calculating portion 54 detects the angle (the angular position) "$\phi$" of the object in response to the output signal from the transmitting and receiving portion 52. The distance and angle calculating portion 54 measures the time interval between the moment of the transmission of a forward laser beam and the moment of the reception of a related echo laser beam in response to the output signal from the transmitting and receiving portion 52. The distance and angle calculating portion 54 detects the distance "r" to the object from the present vehicle on the basis of the measured time interval. The distance and angle calculating portion 54 informs the computer 2 of the angle (the angular position) "$\phi$" of the object and the distance "r" thereto.

The laser beam may be replaced by a radio wave beam, a millimeter wave beam, or an ultrasonic beam. The scanning may be implemented by controlling the echo beam reception by the transmitting and receiving portion 52.

The vehicle speed sensor 22 is associated with a wheel of the present vehicle. The vehicle speed sensor 22 detects the rotational speed of the vehicle wheel. The vehicle speed sensor 22 outputs a signal to the computer 2 which represents the detected rotational speed of the vehicle wheel.

The steering sensor 24 detects the degree of operation of a vehicle steering wheel (not shown), that is, the steering angle in the present vehicle. Specifically, the steering sensor 24 detects a quantity of change of the steering angle. The steering sensor 24 outputs a signal to the computer 2 which represents the detected quantity of change of the steering angle. When the power supply switch 38 is moved to its on position, a variable used in the computer 2 as an indication of a detected steering angle "θ" (radian) is initialized to "0". After the movement of the power supply switch 38 to its on position, the detected steering angle "θ" is decided by integrating the quantity of change of the steering angle which is represented by the output signal of the steering sensor 24.

The yaw rate sensor 26 detects the rate Ω (radian/second) of change in the rotational angle (the yaw angle) of the body of the present vehicle about the vertical axis thereof. The yaw rate sensor 26 informs the computer 2 of the detected yaw rate Ω.

When the cruise control switch 28 is changed to its on position, the computer 2 operates to start the vehicle cruise control. During the execution of the vehicle cruise control, signal processing for the inter-vehicle distance control can be implemented by the computer 2. When the computer 2 determines that the present vehicle is excessively close to an objective preceding vehicle, the alarm sound generator 50 is activated by the computer 2 to generate alarm sound. The volume of the generated alarm sound is equal to a level adjustably determined by the alarm sound volume setting device 34. The sensitivity of generation of alarm sound can be adjusted by the alarm sensitivity setting device 36.

The brake switch 30 detects depression of a brake pedal of the present vehicle. The brake switch 30 informs the computer 2 of the detected brake-pedal depression. The brake drive device 44 adjusts the braking pressure in response to the drive signal outputted from the computer 2.

The throttle opening degree sensor 32 detects the degree of opening through a vehicular engine throttle valve. The throttle opening degree sensor 32 outputs a signal to the computer 2 which represents the detected throttle opening degree. The computer 2 controls the throttle drive device 46 in response to the detected throttle opening degree, thereby adjusting the actual degree of opening through the throttle valve and adjusting the power output of the engine.

The computer 2 determines whether or not the distance and angle measurement device 4 is operating normally by referring to the output signal therefrom. When the computer 2 determines that the distance and angle measurement device 4 is not operating normally, the sensor failure indicator 40 is controlled by the computer 2 to indicate a failure.

The computer 2 selects an objective preceding vehicle from among candidate preceding vehicles detected in response to the output signal of the distance and angle measurement device 4. The computer 2 calculates the distance to the objective preceding vehicle from the present vehicle. The distance indicator 42 is controlled by the computer 2 to indicate the calculated distance to the objective preceding vehicle from the present vehicle.

The automotive automatic transmission control device 48 selects a used gear position of an automotive automatic transmission and thereby controls the speed of the present vehicle in response to the output signal from the computer 2.

Figure 4:
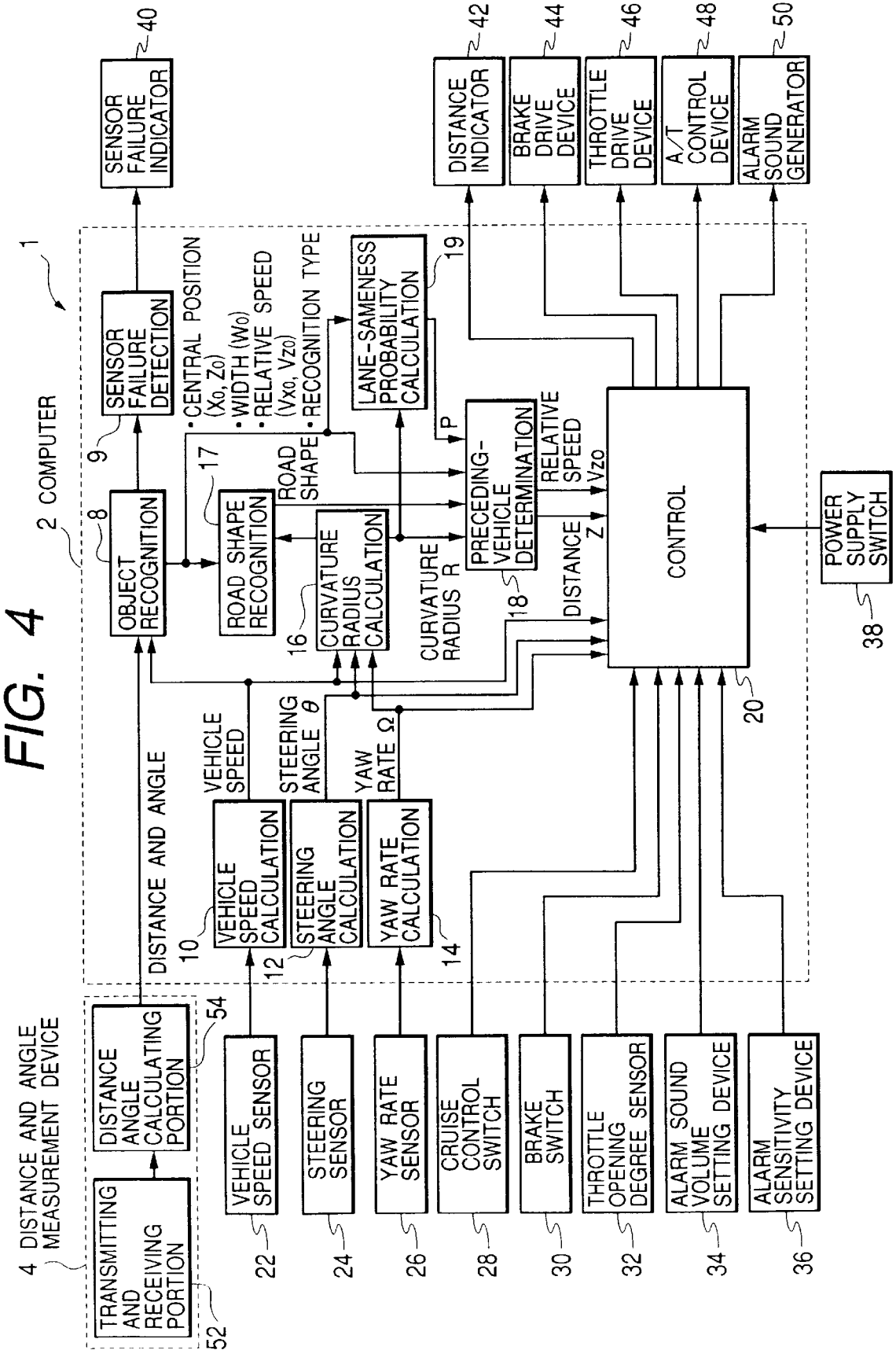
FIG. 4 is an operation flow diagram of a computer in FIG. 3.

FIG. 4 shows the flow of operation of the computer 2 rather than the hardware structure thereof. With reference to FIG. 4, an object recognition block 8 receives, from the distance and angle calculating portion 54 in the distance and angle measurement device 4, measurement data representing a distance "r" and an angle "φ" concerning each detected object. The object recognition block 8 converts the distance and angle data of polar coordinates into measurement data of X-Z orthogonal coordinates designed so that the origin (0, 0) coincides with the center of a laser radar formed by the distance and angle measurement device 4, and the X axis and the Z axis coincide with a width-wise direction and a longitudinal forward direction of the present vehicle respectively.

A vehicle speed calculation block 10 computes the speed V of the present vehicle on the basis of the output signal from the vehicle speed sensor 22. The vehicle speed calculation block 10 informs the object recognition block 8 of the computed vehicle speed V.

The object recognition block 8 calculates and determines the central position $(X_0, Z_0)$ and transverse width $W_0$ of each detected object, the speed $(VX_0, VZ_0)$ of the object relative to the present vehicle, and the recognition type of the object on the basis of the orthogonal-coordinate measurement data and the vehicle speed V. Here, the recognition type of each detected object indicates whether the object is stationary or moving. Regarding the central position $(X_0, Z_0)$ of each detected object, $X_0$ denotes the position of the center of the object in the width-wise direction of the present vehicle while $Z_0$ denotes the position of the center of the object in the longitudinal forward direction of the present vehicle.

A steering angle calculation block 12 computes the steering angle "θ" regarding the present vehicle on the basis of the output signal from the steering sensor 24. A yaw rate calculation block 14 computes the yaw rate Ω of the present vehicle on the basis of the output signal from the yaw rate sensor 26.

A curvature-radius calculation block 16 is informed of the vehicle speed V by the vehicle speed calculation block 10. The curvature-radius calculation block 16 is informed of the steering angle "θ" by the steering angle calculation block 12. The curvature1 radius calculation block 16 is informed of the yaw rate Ω by the yaw rate calculation block 14. The curvature-radius calculation block 16 computes the radius R of curvature of the course of the present vehicle (or the radius R of curvature of the road) on the basis of the vehicle speed V, the steering angle "θ", and the yaw rate Ω.

A lane-sameness probability calculation block 19 is informed of the curvature radius R by the curvature-radius calculation block 16. The lane-sameness probability calculation block 19 is informed of the central position $(X_0, Z_0)$, the transverse width $W_0$, the relative speed $(VX_0, VZ_0)$, and the recognition type of each detected object by the object recognition block 8. The lane-sameness probability calculation block 19 detects preceding vehicles among the detected objects by referring to the recognition types thereof. The lane-sameness probability calculation block 19 computes the probability (the lane-sameness probability) P that the lanes along which the present vehicle and each preceding vehicle are traveling respectively are the same on the basis of the curvature radius R, and the central position $(X_0, Z_0)$, the transverse width $W_0$, and the relative speed $(VX_0, VZ_0)$.

The object recognition block 8 determines whether or not each detected object is a reflector on the road. The object recognition block 8 informs a road-shape recognition block 17 of the result of the determination. In addition, the object recognition block 8 informs the road-shape recognition block 17 of the central position $(X_0, Z_0)$ of each detected reflector. On the other hand, the road-shape recognition block 17 is informed of the curvature radius R by the curvature-radius calculation block 16. The road-shape recognition block 17 recognizes the shape of the road on the basis of the central position ($X_0$, $Z_0$) of each detected reflector and the curvature radius R.

A preceding-vehicle determination block 18 is informed of the curvature radius R by the curvature-radius calculation block 16. The preceding-vehicle determination block 18 is informed of the lane-sameness probability P for each preceding vehicle by the lane-sameness probability calculation block 19. The preceding-vehicle determination block 18 is informed of the central position ($X_0$, $Z_0$), the transverse width $W_0$, the relative speed ($VX_0$, $VZ_0$), and the recognition type of each detected object by the object recognition block 8. The preceding-vehicle determination block 18 is informed of the recognized road shape by the road-shape recognition block 17. The preceding-vehicle determination block 18 detects an objective preceding vehicle on the basis of the lane-sameness probabilities P, the curvature radius R, the recognized road shape, the central positions ($X_0$, $Z_0$), the transverse widths $W_0$, the relative speeds ($VX_0$, $VZ_0$), and the recognition types of the detected objects. Specifically, the preceding-vehicle determination block 18 selects an objective preceding vehicle from among candidate objects and candidate preceding vehicles in response to the lane-sameness probabilities P, the curvature radius R, the recognized road shape, the central positions ($X_0$, $Z_0$), the transverse widths $W_0$, the relative speeds ($VX_0$, $VZ_0$), and the recognition types of the detected objects. The preceding-vehicle determination block 18 informs a control block 20 of the distance $Z_0$ to the objective preceding vehicle from the present vehicle, and also the relative speed $VZ_0$ of the objective preceding vehicle in the longitudinal forward direction of the present vehicle (that is, the direction along which the present vehicle is traveling).

The control block 20 is informed of the vehicle speed V by the vehicle speed calculation block 10. The control block 20 is informed of the steering angle "θ" by the steering angle calculation block 12. The control block 20 is informed of the yaw rate Ω by the yaw rate calculation block 14. The control block 20 receives the output signals from the devices 28, 30, 32, 34, and 36. The control block 20 generates drive signals for the devices 42, 44, 46, 48, and 50 in response to the distance $Z_0$ to the objective preceding vehicle from the present vehicle, the relative speed $VZ_0$ of the objective preceding vehicle, the vehicle speed V, the steering angle "θ", the yaw rate Ω, and the output signals of the devices 28, 30, 32, 34, and 36. The control block 20 outputs the generated drive signals to the devices 42, 44, 46, 48, and 50. For example, the control block 20 generates drive signals for the devices 42, 44, 46, 48, and 50 on the basis of the distance $Z_0$ to the objective preceding vehicle from the present vehicle, the relative speed $VZ_0$ of the objective preceding vehicle, the state of the cruise control switch 28, and the brake-pedal depression-related condition represented by the output signal of the brake switch 30. The drive signals for the brake drive device 44, the throttle drive device 46, and the automotive automatic transmission control device 48 are designed to adjust the actual distance to the objective preceding vehicle from the present vehicle. The drive signal for the distance indicator 42 is designed to indicate the distance to the objective preceding vehicle from the present vehicle. The drive signal for the alarm sound generator 50 is designed to generate alarm sound and hence warn the driver of the present vehicle when the relation of the present vehicle with the objective preceding vehicle falls into prescribed warning conditions. The control block 20 outputs the generated drive signals to the devices 42, 44, 46, 48, and 50.

A sensor failure detection block 9 receives the output data (the object-recognition result data) from the object recognition block 8 which represent the object parameters calculated thereby. The sensor failure detection block 9 determines whether the output data from the object recognition block 8 are in a normal range or an abnormal range, that is, whether the distance and angle measurement device 4 is operating normally or abnormally. When the output data from the object recognition block 8 are in the abnormal range, the sensor failure detection block 9 activates the sensor failure indicator 40 to indicate a failure of the distance and angle measurement device 4.

The object recognition block 8 corresponds to relative position detecting means. The lane-sameness probability calculation block 19 corresponds to lane-sameness probability calculating means. The preceding-vehicle determination block 18 corresponds to preceding-vehicle detecting means.

As previously mentioned, the computer 2 operates in accordance with a program stored in its internal ROM or RAM. FIG. 5 is a flowchart of a segment of the program for the computer 2 which relates to the recognition of a road shape. The program segment in FIG. 5 is repetitively executed at a period corresponding to the period of the scanning implemented by the distance and angle measurement device 4. The period of repetitive execution of the program segment is equal to, for example, 100 msec.

As shown in FIG. 5, a first step S100 of the program segment receives distance and angle measurement data from the distance and angle measurement device 4 for one period of the scanning. In other words, the step S100 receives distance and angle measurement data corresponding to one frame. The scanning period is equal to, for example, 100 msec.

A step S200 following the step S100 converts the distance and angle data of polar coordinates into measurement data of X-Z orthogonal coordinates. The step S200 calculates the central position ($X_0$, $Z_0$) and transverse width $W_0$ of each detected object on the basis of the orthogonal-coordinate measurement data. The step S200 computes a time-domain variation in the central position ($X_0$, $Z_0$) of each detected object. The step S200 calculates the speed ($VX_0$, $VZ_0$) of each detected object relative to the present vehicle on the basis of the computed time-domain variation in the central position ($X_0$, $Z_0$) thereof. The step S200 gets information of the speed V of the present vehicle from the output signal of the vehicle speed sensor 22. The step S200 determines whether each detected object is stationary or moving on the basis of the vehicle speed V and the relative speed ($VX_0$, $VZ_0$) of the object. For example, in the case where the relative speed ($VX_0$, $VZ_0$) of an object indicates that the central position ($X_0$, $Z_0$) thereof relative to the present vehicle is substantially fixed while the vehicle speed V differs from zero, the step S200 determines that the object is moving. In the case where the relative speed ($VX_0$, $VZ_0$) of an object indicates that the central position ($X_0$, $Z_0$) thereof is moving away from the present vehicle, the step S200 determines that the object is moving. In the case where the relative speed ($VX_0$, $VZ_0$) of an object indicates that the central position ($X_0$, $Z_0$) thereof is moving toward the present vehicle at a speed equal to the vehicle speed V, the step S200 determines that the object is stationary. The step S200 recognizes other objects to be undetermined. An example of other objects is one which appears in the detection area at a moment preceding the present time by a short interval insufficient to implement the "stationary/moving" determination.

A step S300 subsequent to the step S200 gets information of the steering angle "θ" from the output signal of the steering sensor 24. The step S300 gets information of the yaw rate Ω from the output signal of the yaw rate sensor 26. Also, the step S300 gets information of the vehicle speed V. The step S300 computes the radius R of curvature of the course of the present vehicle (or the radius R of curvature of the road) on the basis of the vehicle speed V, the steering angle "θ", and the yaw rate Ω.

The step S300 may compute the curvature radius R from the steering angle "θ" and the vehicle speed V according to the following equation.

$$R = C/\theta \quad (1)$$

where C denotes a value depending on the type of the present vehicle and the vehicle speed V. The ROM within the computer 2 stores data representing a map of a predetermined relation among the value C, the type of the present vehicle, and the vehicle speed V. The step S300 derives the value C by accessing the map in response to the vehicle speed V and the type of the present vehicle.

Alternatively, the step S300 may compute the curvature radius R from the vehicle speed V and the yaw rate Ω. In this case, the step S300 divides the vehicle speed V by the yaw rate Ω, and sets the division result as the curvature radius R.

A block S400 following the step S300 recognizes the shape of the road. After the block S400, the current execution cycle of the program segment ends.

As shown in FIG. 6, the road-shape recognition block (the road-shape recognition routine) S400 has a sequence of steps S410, S412, S414, and S416.

The step S410 follows the step S300 in FIG. 5. The step S410 selects probable delineators from among the detected objects. Specifically, the step S410 considers only stationary objects detected by the step S200 in FIG. 5. From among the stationary objects, the step S410 selects one or more objects each having a transverse width $W_0$ equal to or less than 1 m. The step S410 sets the selected object or objects as the probable delineators. In other words, the step S410 finds one or more objects each having a transverse width $W_0$ greater than 1 m. The step S410 removes the found objects from the probable delineators. Thus, the step S410 excludes transversely wide objects such as signboards and vehicles from the probable delineators. The probable delineators include reflectors located along the road, and reflectors and cat's-eyes located at the boundaries between lanes of the road.

Figure 7:
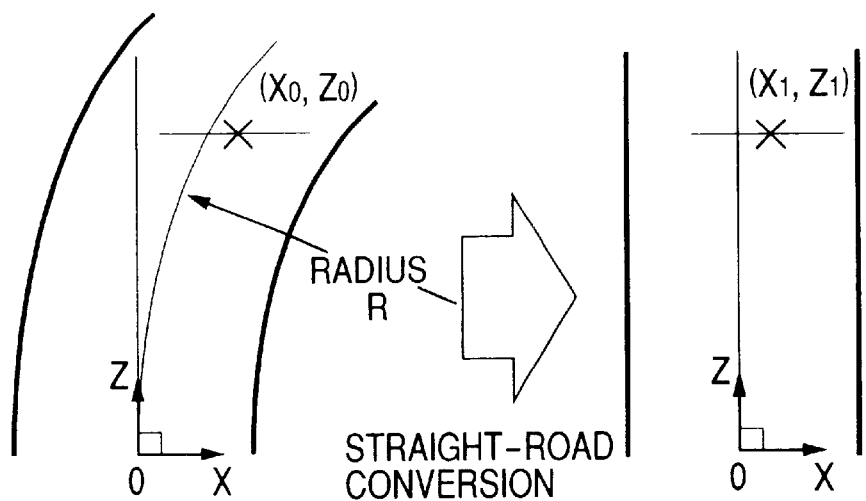
FIG. 7 is a diagram of conversion of coordinates.

The step S412 is subsequent to the step S410. As shown in FIG. 7, the step S412 converts the coordinates $(X_0, Z_0)$ of the central position of each probable delineator into the coordinates $(X_1, Z_1)$ thereof which occur on the assumption that the present vehicle is traveling along a straight road. The step S412 searches the probable delineators for one or ones each having a coordinate value $X_1$ greater than a predetermined criterion. The step S412 excludes such a probable delineator or delineators from consideration concerning road-shape recognition. Specifically, the step S412 gets information of the curvature radius R given by the step S300 in FIG. 5. The step S412 converts the coordinate values $X_0$ and $Z_0$ into the coordinate values $X_1$ and $Z_1$ according to the following equations.

$$X_1 = X_0 - Z_0 \cdot Z_0 / 2R$$
$$Z_1 = Z_0 \quad (2)$$

where R denotes the curvature radius. The equations (2) are made on the basis of approximation using the assumption that the absolute value of the coordinate value $X_0$ is significantly smaller than the curvature radius R and the coordinate value $Z_0$ ($|X_0| << |R|$ and $|X_0| << Z_0$). The step S412 determines whether or not the absolute value of each coordinate value $X_1$ satisfies the following condition.

$$|X_1| > 3.5\text{m} \quad (3)$$

In other words, the step S412 determines whether or not the absolute value of each coordinate value $X_1$ is greater than a predetermined reference, that is, 3.5 m. The step S412 excludes a probable delineator or delineators, whose coordinate values $X_1$ satisfy the condition (3), from ones considered in the road-shape recognition.

The above-indicated condition (3) means the following fact. On each of the left-hand and right-hand sides of the present vehicle, a given width range (for example, a 3.0-m width range) is set as corresponding to the width of the lane along which the present vehicle is traveling. From among probable delineators, one or ones are selected which extend on the boundaries related to the present lane. Only a selected delineator or delineators will be considered in the road-shape recognition.

For example, in the case where the present vehicle is traveling along the center of a straight lane having a width of 3.5 m, the left-hand boundary (the left-hand edge) of the present lane corresponds to a coordinate value $X_1$ of −1.75 m while the righthand boundary (the right-hand edge) of the present lane corresponds to a coordinate value $X_1$ of 1.75 m. Here, the "present" lane means the lane along which the present vehicle is traveling. On the other hand, the left-hand boundary (the left-hand edge) of a lane leftwardly next to the present lane corresponds to a coordinate value $X_1$ of −5.25 m. The right-hand boundary (the right-hand edge) of a lane rightwardly next to the present lane corresponds to a coordinate value $X_1$ of 5.25 m. Therefore, delineators on the lefthand edge of the leftwardly next lane and those on the right-hand edge of the rightwardly next lane do not satisfy the previously-indicated condition (3). Thus, such delineators are excluded. Accordingly, it is possible to select only delineators on the boundaries of the present lane (the lane along which the present vehicle is traveling).

In the absence of the steering sensor 24 and the yaw rate sensor 26, the step S412 determines whether or not the absolute value of each coordinate value $X_0$ satisfies the following condition.

$$|X_0| > 4.0 \text{ m} \quad (4)$$

In other words, the step S412 determines whether or not the absolute value of each coordinate value $X_0$ is greater than a predetermined reference, that is, 4.0 m. The step S412 excludes a probable delineator or delineators, whose coordinate values $X_0$ satisfy the condition (4), from ones considered in the road-shape recognition.

In the case where the curvature radius R has a relatively large error, the step S412 may use both the previously-indicated conditions (3) and (4) to select only delineators on the boundaries of the present lane.

Figure 8:
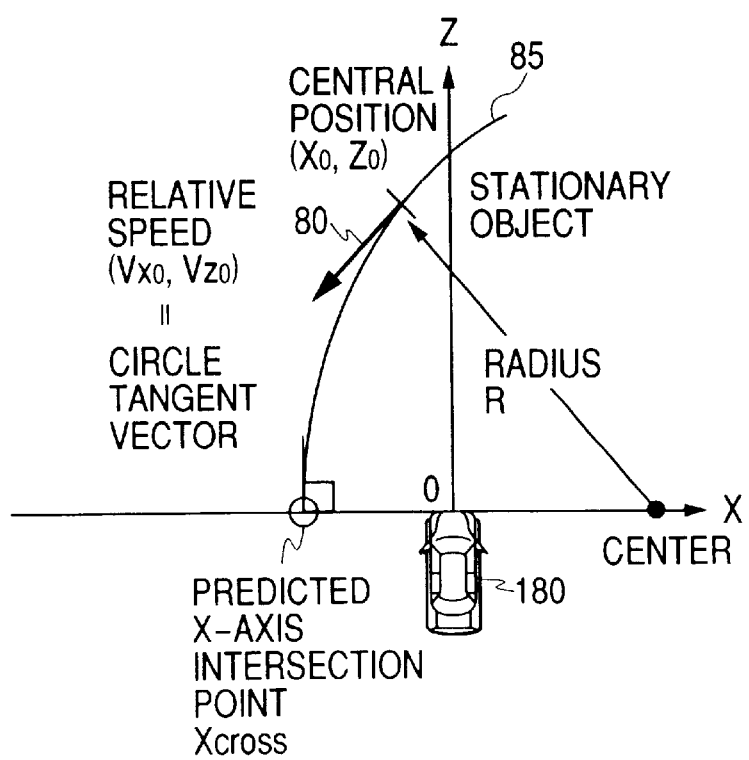
FIG. 8 is a diagram of a vehicle, a stationary object, a portion of a circle, and a predicted transverse position Xcross of the stationary object.

The step S414 follows the step S412. The step S414 calculates predicted transverse positions Xcross of the delineators selected by the step S412. The predicted transverse position Xcross of each delineator means the transverse position relative to the present vehicle through which the delineator passes, that is, the X coordinate of the point of intersection between the X axis and the locus (the trajectory) of the delineator. Specifically, as shown in FIG. 8, a circle 85 having the radius R is calculated for each of the delineators. The circle 85 passes through the central position $(X_0, Z_0)$ of the related delineator. A tangent vector on the circle 85 is equal in direction to the relative speed vector 80 for the related delineator. When it is assumed that the center of the circle 85 is on the X axis, the circle 85 intersects with the X axis at a right angle. Accordingly, in this case, the circle 85 is uniquely decided. The point of intersection between the circle 85 and the X axis is defined as the predicted transverse position Xcross of the related delineator.

In more detail, a circle having the radius R is calculated which passes through the center $(X_0, Z_0)$ of a delineator, and which intersects with the X axis at a right angle. On the supposition that $|X_0| << |R|$ and $|X_0| << Z_0$, a parabola is approximate to the circle and hence the circle is expressed by the following equation.

$$X = X_0 + \{(Z-Z_0)^2 / 2R\} \quad (5)$$

Since the tangent vector on the circle is equal in direction to the relative speed vector (VX, VZ) for the delineator (the stationary object or the stationary target), the following equation is available.

$$dX/dZ = VX/VZ \quad (6)$$

From the equations (5) and (6), the radius R is given as follows.

$$R = (Z-Z_0) \cdot VZ/VX \quad (7)$$

Therefore, the circle is expressed by the following equation.

$$X = X_0 + \{(Z-Z_0) \cdot VX/2VZ\} \quad (8)$$

When Z=0, the equation (8) changes into the following version.

$$X = X_0 - Z_0 \cdot VX/2VZ \quad (9)$$

The point of intersection between the circle and the X axis is defined as a predicted transverse position Xcross expressed by the following equation.

$$Xcross = X_0 - Z_0 \cdot VX/2VZ \quad (10)$$

The step S414 calculates the predicted transverse positions Xcross of the respective delineators according to the equation (10). The introduction of the predicted transverse positions Xcross of the respective delineators enhances the accuracy of the road-shape recognition.

The step S416 is subsequent to the step S414. The step S416 checks the signs of the predicted transverse positions Xcross given by the step S414. The step S416 separates the predicted transverse positions Xcross into a group of positive ones and a group of negative ones. Among the delineators selected by the step S412, the delineators corresponding to the positive predicted transverse positions Xcross are recognized as being in the right-hand side of the present lane while the delineators corresponding to the negative predicted transverse positions Xcross are recognized as being in the left-hand side of the present lane. The step S416 connects the central positions $(X_0, Z_0)$ of the right-hand delineators and the predicted transverse position Xcross of the right-hand delineator nearest to the present vehicle by lines, and recognizes a set of the lines as the right-hand edge of the present lane. The step S416 connects the central positions $(X_0, Z_0)$ of the left-hand delineators and the predicted transverse position Xcross of the left-hand delineator nearest to the present vehicle by lines, and recognizes a set of the lines as the left-hand edge of the present lane. Under certain conditions, only one of the right-hand and left-hand edges of the present lane is detected. After the step S416, the current execution cycle of the program segment ends.

The step S410 corresponds to reflector detecting means (reflector discriminating means). The step S300 corresponds to curvature radius calculating means. The step S412 corresponds to position converting means and reflector-row extracting means. The step S414 corresponds to position estimating means. The step S416 corresponds to road-shape recognizing means.

The road-shape recognition apparatus in the inter-vehicle distance control apparatus 1 provides advantages as follows.

Among detected stationary objects, the step S410 in FIG. 6 finds one or ones each having a transverse width $W_0$ greater than 1 m. The step S410 removes the found objects from probable delineators. Thus, the step S410 excludes transversely wide objects such as signboards and vehicles from the probable delineators. Accordingly, the resultant probable delineators reliably correspond to actual delineators.

Figure 9:
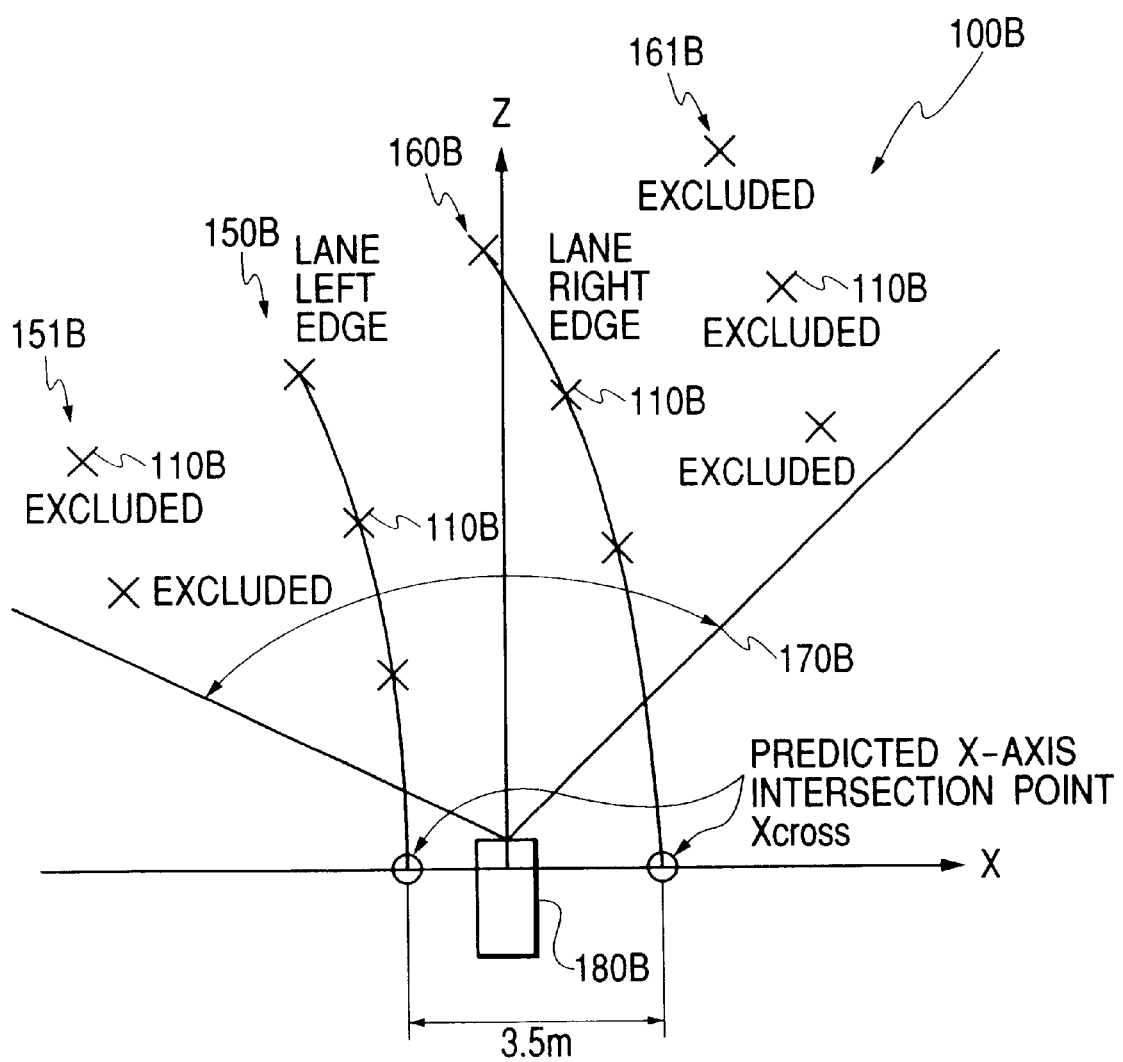
FIG. 9 is a diagram of a road, reflector rows (delineator rows), and a vehicle on which the inter-vehicle distance control apparatus of FIG. 3 is mounted.

FIG. 9 shows a road 100B having rows 150B, 151B, 160B, and 161B of delineators (reflectors or cat's-eyes) 110B which indicate the boundaries between lanes. A vehicle 180B is traveling along the lane between the delineator rows 150B and 160B.

In the case where the inter-vehicle distance control apparatus 1 including the road-shape recognition apparatus is mounted on the vehicle 180B of FIG. 9, the detection area (the given object-detectable angular region) 170B provided by the distance and angle measurement device 4 extends in front of the vehicle 180B. The delineator rows 151B and 161B extend outside the lane-width corresponding region centered at the vehicle 180B. Therefore, the delineator rows 151B and 161B are excluded from consideration concerning the road-shape recognition. In other words, only the delineator rows 150B and 160B corresponding to the edges of the lane along which the vehicle 180B is traveling are used in the road-shape recognition. Accordingly, it is possible to accurately detect the edges of the present lane, and to accurately recognize the shape of the present lane.

The steering angle "θ" of the present vehicle is detected via the steering sensor 24. The yaw rate Ω of the present vehicle is detected via the yaw rate sensor 26. The radius R of curvature of the course of the present vehicle (or the radius R of curvature of the road) is calculated from the parameters including the steering angle "θ" and the yaw rate Ω. The coordinates $(X_0, Z_0)$ of the central position of each probable delineator are converted into the coordinates $(X_1, Z_1)$ thereof in response to the curvature radius R which occur on the assumption that the present vehicle is traveling along a straight road. The step S412 in FIG. 6 searches the probable delineators for one or ones each having a coordinate value $X_1$ greater than a predetermined criterion. The step S412 excludes such a probable delineator or delineators from consideration concerning the road-shape recognition. Accordingly, even in the case where the present vehicle is entering a curved road portion, the delineator rows related to the present lane can be accurately detected and also the road-shape recognition can be accurately implemented.

The step S414 in FIG. 6 calculates predicted transverse positions Xcross of detected delineators. The predicted transverse position Xcross of each delineator means the transverse position relative to the present vehicle through which the delineator passes, that is, the X coordinate of the point of intersection between the X axis and the locus (the trajectory) of the delineator. The predicted transverse positions Xcross give information of portions of delineator rows which extend outside the detection area (the given object-detectable angular region) provided by the distance and angle measurement device 4. Therefore, the road-shape recognition can be accurately implemented.

Second Embodiment

A second embodiment of this invention is similar to the first embodiment thereof except that a road-shape recognition block S400A replaces the road-shape recognition block S400 in FIGS. 5 and 6. The road-shape recognition block S400A corresponds to a road-shape recognition routine.

Figure 10:
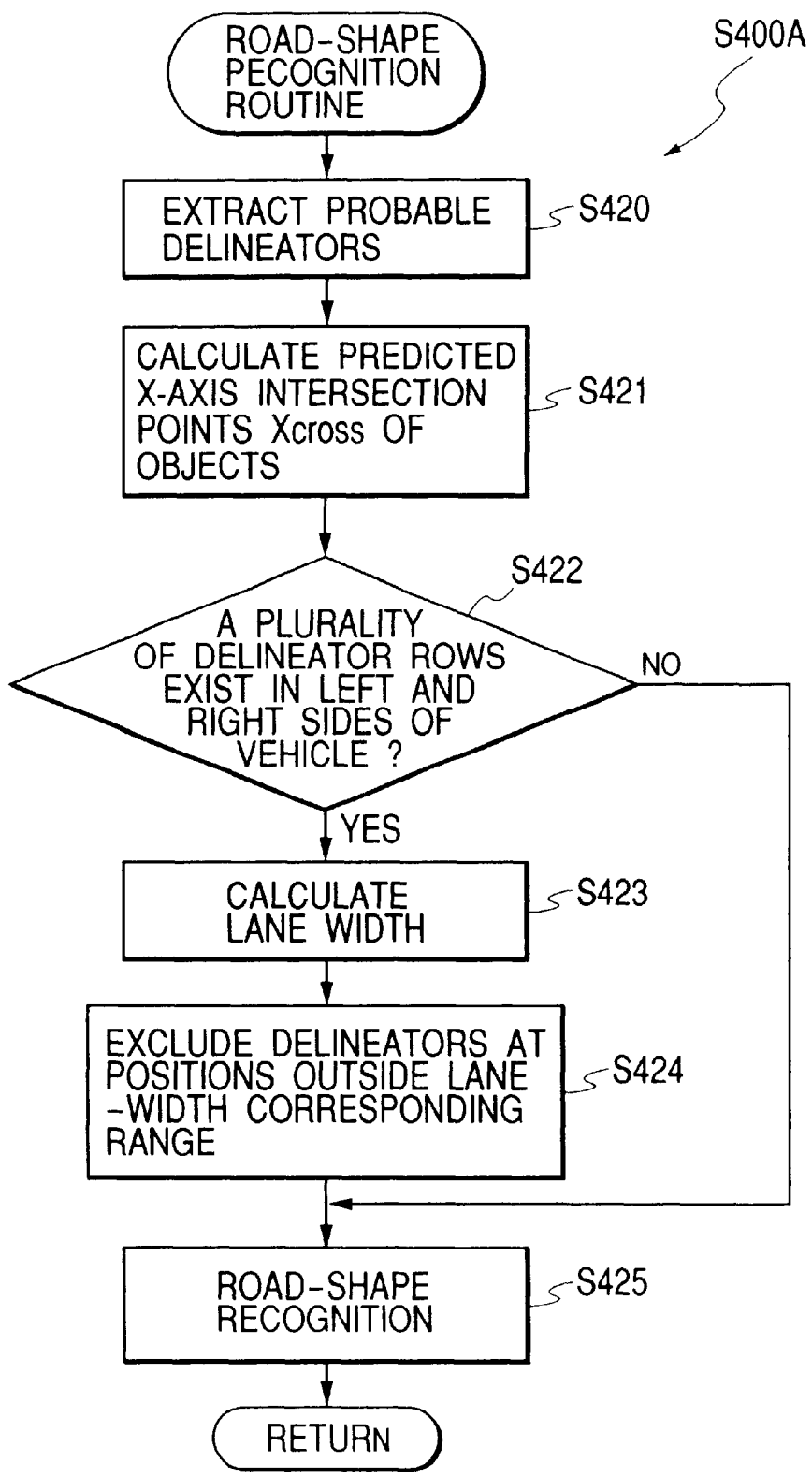
FIG. 10 is a flowchart of a block in a program according to a second embodiment of this invention.

As shown in FIG. 10, the road-shape recognition block (the road-shape recognition routine) S400A has a sequence of steps S420, S421, S422, S423, S424, and S425.

The step S420 follows the step S300 in FIG. 5. The step S420 selects probable delineators from among detected objects as the step S410 in FIG. 6 does.

The step S421 is subsequent to the step S420. The step S421 calculates predicted transverse positions Xcross of the probable delineators given by the step S420 as the step S414 in FIG. 6 does. The step S421 separates the predicted transverse positions Xcross into groups each having ones close to each other. The step S421 determines typical predicted transverse positions TXcross for the respective groups through a statistical process. For example, central one or average one of the predicted transverse positions Xcross in each group is selected as a typical predicted transverse position TXcross. The groups correspond to delineator rows respectively. Similarly, the typical predicted transverse positions TXcross correspond to the delineator rows respectively.

The step S422 follows the step S421. The step S422 determines whether or not a plurality of delineator rows are located in each of the left-hand and right-hand sides of the present vehicle on the basis of the typical predicted transverse positions TXcross given by the step S421. Specifically, the step S422 determines whether or not a plurality of typical predicted transverse positions TXcross correspond to each of the left-hand and right-hand sides of the present vehicle. In the case where only one typical predicted transverse position TXcross corresponds to the left-hand side of the present vehicle while only one typical predicted transverse position TXcross corresponds to the right-hand side of the present vehicle, the program jumps from the step S422 to the step S425. In the case where only one typical predicted transverse position TXcross corresponds to the left-hand side of the present vehicle while none corresponds to the right-hand side of the present vehicle, the program jumps from the step S422 to the step S425. Similarly, in the case where only one typical predicted transverse position TXcross corresponds to the right-hand side of the present vehicle while none corresponds to the left-hand side of the present vehicle, the program jumps from the step S422 to the step S425. In the case where two or more typical predicted transverse positions TXcross correspond to the left-hand side of the present vehicle, the program advances from the step S422 to the step S423. Similarly, in the case where two or more typical predicted transverse positions TXcross correspond to the right-hand side of the present vehicle, the program advances from the step S422 to the step S423.

The step S423 calculates the lane width from the interval between neighboring ones of the typical predicted transverse positions TXcross corresponding to either the left-hand side of the present vehicle or the right-hand side thereof. The step S423 may calculate the lane width from the interval between the typical predicted transverse positions TXcross corresponding to the left-hand and right-hand edges of the lane along which the present vehicle is traveling.

The step S424 is subsequent to the step S423. The step S424 converts the coordinates $(X_0, Z_0)$ of the central position of each probable delineator into the coordinates $(X_1, Z_1)$ thereof which occur on the assumption that the present vehicle is traveling along a straight road. The conversion of the coordinates is similar to that implemented by the block S412 in FIG. 6. The step S424 calculates a lane-width corresponding value on the basis of the lane width given by the step S423. The step S424 searches the probable delineators for one or ones each having a coordinate value $X_1$ greater than the lane-width corresponding value. The step S424 excludes such a probable delineator or delineators from consideration concerning road-shape recognition. In other words, the step S424 selects only probable delineators each having a coordinate value $X_1$ equal to or less than the lane-width corresponding value. The selected probable delineators will be considered in the road-shape recognition. For example, in the case where the lane-width corresponding value is equal to 3.0 m, the step S424 excludes probable delineators having coordinate values $X_1$ separate from the present-vehicle coordinate value (X=0) by intervals of greater than 3.0 m. After the step S424, the program advances to the step S425.

The step S425 implements the road-shape recognition as the step S416 in FIG. 6 does. Specifically, the step S425 detects the right-hand and left-hand edges of the present lane (the road), and recognizes the shape of the present lane (the road) in response to the probable delineators selected by the step S424 or the probable delineators given by the step S420. After the step S425, the current execution cycle of the program segment ends.

The step S422 may determine whether or not a plurality of delineator rows are located in the left-hand side of the present vehicle. Alternatively, the step S422 may determine whether or not a plurality of delineator rows are located in the right-hand side of the present vehicle. In the case where two or more typical predicted transverse positions TXcross for each of the left-hand and right-hand sides of the present vehicle are available at least once during the last 3-second time interval, the step S422 may determine that a plurality of delineator rows are located in each of the left-hand and right-hand sides of the present vehicle.

The step S422 corresponds to determining means. The step S423 corresponds to lane-width calculating means.

The second embodiment of this invention has the following advantage. In the second embodiment of this invention, the lane width is calculated (see the step S423 in FIG. 10). The reference region for the determination as to whether or not probable delineators should be excluded is set depending on the calculated lane width (see the step S424 in FIG. 10). Accordingly, even in the case where the present vehicle is traveling along a lane having a variable width, the lane shape (the road shape) can be accurately recognized.

Third Embodiment

A third embodiment of this invention is similar to the first embodiment thereof except that a road-shape recognition block S400B replaces the road-shape recognition block S400 in FIGS. 5 and 6. The road-shape recognition block S400B corresponds to a road-shape recognition routine.

Figure 11:
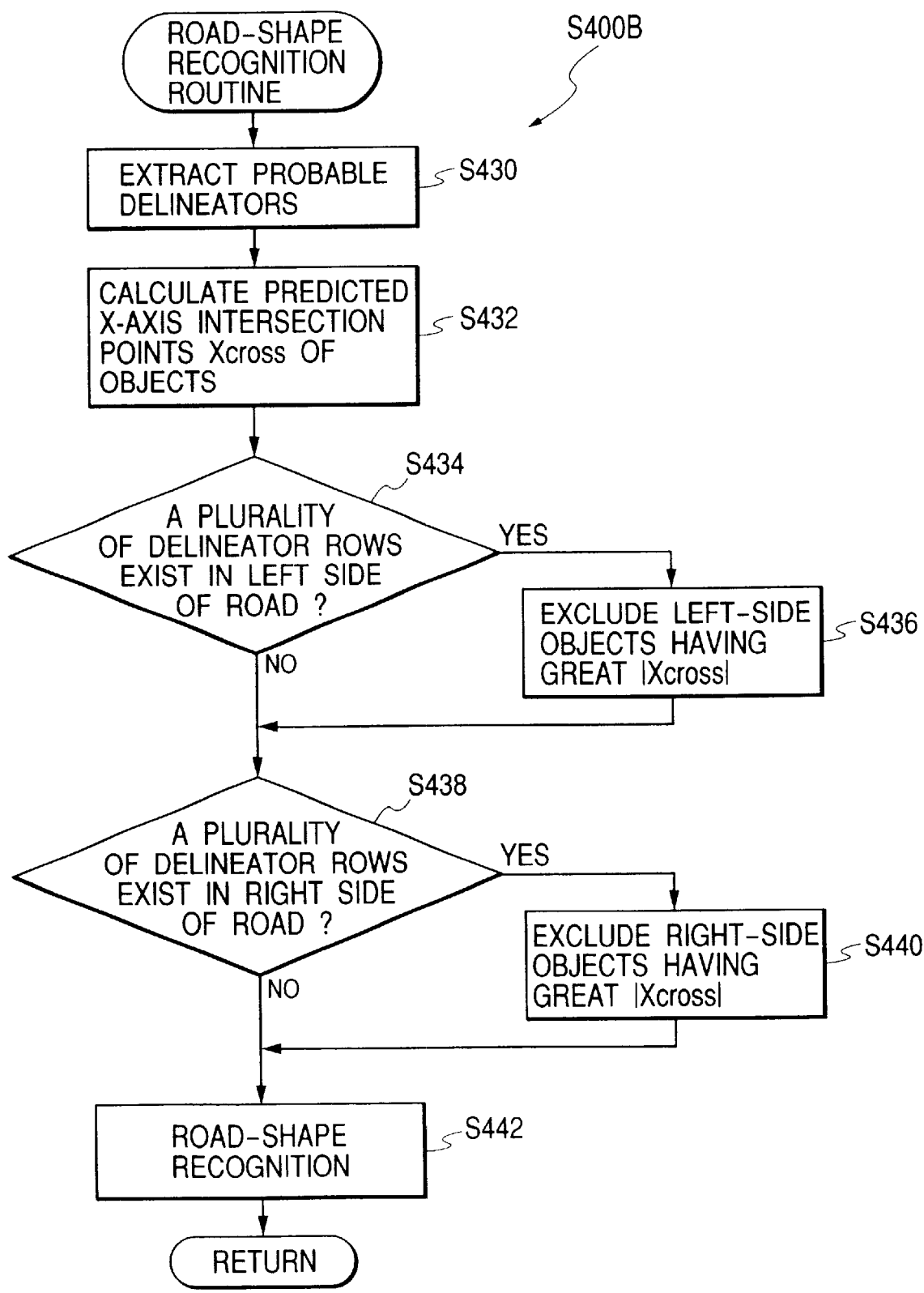
FIG. 11 is a flowchart of a block in a program according to a third embodiment of this invention.

As shown in FIG. 11, the road-shape recognition block (the road-shape recognition routine) S400B has a sequence of steps S430, S432, S434, S436, S438, S440, and S442.

The step S430 follows the step S300 in FIG. 5. The step S430 selects probable delineators from among detected objects as the step S410 in FIG. 6 does.

The step S432 is subsequent to the step S430. The step S432 calculates predicted transverse positions Xcross of the probable delineators given by the step S430 as the step S414 in FIG. 6 does. The step S432 separates the predicted transverse positions Xcross into groups each having ones close to each other. The step S432 determines typical predicted transverse positions TXcross for the respective groups through a statistical process. For example, central one or average one of the predicted transverse positions Xcross in each group is selected as a typical predicted transverse position TXcross. The groups correspond to delineator rows respectively. Similarly, the typical predicted transverse positions TXcross correspond to the delineator rows respectively.

The step S434 follows the step S432. The step S434 determines whether or not a plurality of delineator rows are located in the left-hand side of the road on the basis of the typical predicted transverse positions TXcross given by the step S432. Specifically, the step S434 checks the signs of the typical predicted transverse positions TXcross. The step S434 forms negative typical predicted transverse positions TXcross into a group corresponding to the left-hand side of the road. The step S434 calculates the difference between the rightmost typical predicted transverse position and the leftmost typical predicted transverse position in the group. The step S434 compares the calculated difference with a lane-width corresponding value (for example, 3.0 m). When the calculated difference is equal to or greater than the lane-width corresponding value, the step S434 determines that a plurality of delineator rows are located in the left-hand side of the road. Otherwise, the step S434 determines that a plurality of delineator rows are not located in the left-hand side of the road. In the case where a plurality of delineator rows are located in the left-hand side of the road, the program advances from the step S434 to the step S436. Otherwise, the program jumps from the step S434 to the step S438.

The step S436 searches the probable delineators in the left-hand side of the road for one or ones each corresponding to a predicted transverse position Xcross having an absolute value greater than a predetermined criterion. The step S436 excludes such a probable delineator or delineators from consideration concerning road-shape recognition. In other words, the step S436 selects only left-hand probable delineators each corresponding to a predicted transverse position Xcross having an absolute value equal to or less than the predetermined criterion. The selected probable delineators will be considered in the road-shape recognition. The processing by the step S436 may be similar to that by the step S412 in FIG. 6. After the step S436, the program advances to the step S438.

The step S438 determines whether or not a plurality of delineator rows are located in the right-hand side of the road on the basis of the typical predicted transverse positions TXcross given by the step S432. Specifically, the step S438 checks the signs of the typical predicted transverse positions TXcross. The step S438 forms positive typical predicted transverse positions TXcross into a group corresponding to the right-hand side of the road. The step S438 calculates the difference between the rightmost typical predicted transverse position and the leftmost typical predicted transverse position in the group. The step S438 compares the calculated difference with a lane-width corresponding value (for example, 3.0 m). When the calculated difference is equal to or greater than the lane-width corresponding value, the step S438 determines that a plurality of delineator rows are located in the right-hand side of the road. Otherwise, the step S438 determines that a plurality of delineator rows are not located in the right-hand side of the road. In the case where a plurality of delineator rows are located in the right-hand side of the road, the program advances from the step S438 to the step S440. Otherwise, the program jumps from the step S438 to the step S442.

The step S440 searches the probable delineators in the right-hand side of the road for one or ones each corresponding to a predicted transverse position Xcross having an absolute value greater than a predetermined criterion. The step S440 excludes such a probable delineator or delineators from consideration concerning the road-shape recognition. In other words, the step S440 selects only right-hand probable delineators each corresponding to a predicted transverse position Xcross having an absolute value equal to or less than the predetermined criterion. The selected probable delineators will be considered in the road-shape recognition. The processing by the step S440 may be similar to that by the step S412 in FIG. 6. After the step S440, the program advances to the step S442.

The step S442 implements the road-shape recognition as the step S416 in FIG. 6 does. Specifically, the step S442 detects the right-hand and left-hand edges of the present lane (the road), and recognizes the shape of the present lane (the road) in response to the probable delineators selected by the steps S436 and S440 or the probable delineators given by the step S430. After the step S442, the current execution cycle of the program segment ends.

In the case where the difference between the rightmost typical predicted transverse position and the leftmost typical predicted transverse position in the left-hand group becomes equal to or greater than the lane-width corresponding value at least once during the last 3-second time interval, the step S434 may determine that a plurality of delineator rows are located in the left-hand side of the road.

In the case where the difference between the rightmost typical predicted transverse position and the leftmost typical predicted transverse position in the right-hand group becomes equal to or greater than the lane-width corresponding value at least once during the last 3-second time interval, the step S438 may determine that a plurality of delineator rows are located in the right-hand side of the road.

Fourth Embodiment

A fourth embodiment of this invention is similar to the first embodiment thereof except that a road-shape recognition block S400C replaces the road-shape recognition block S400 in FIGS. 5 and 6. The road-shape recognition block S400C corresponds to a road-shape recognition routine.

Figure 12:
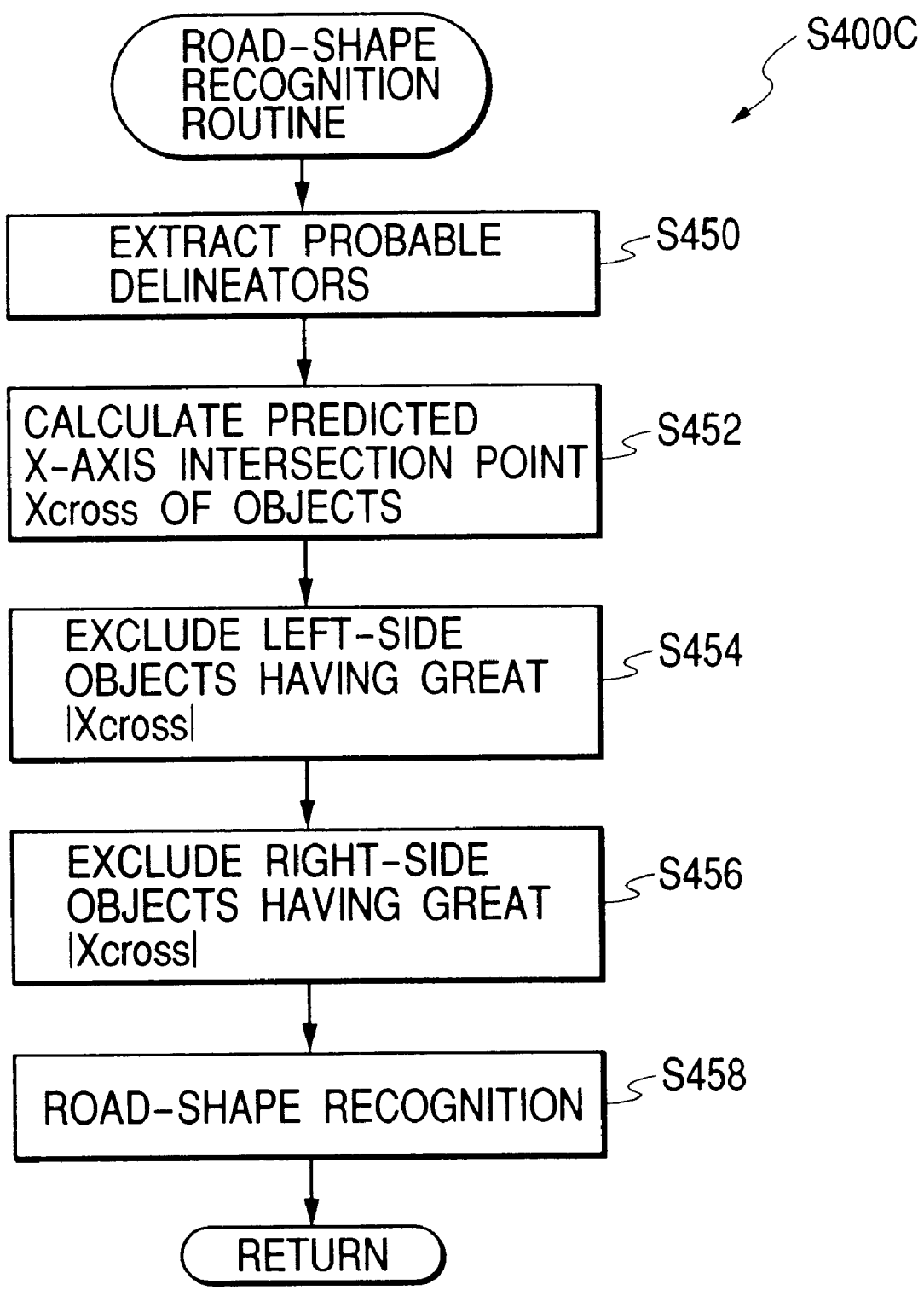
FIG. 12 is a flowchart of a block in a program according to a fourth embodiment of this invention.

As shown in FIG. 12, the road-shape recognition block (the road-shape recognition routine) S400C has a sequence of steps S450, S452, S454, S456, and S458.

The step S450 follows the step S300 in FIG. 5. The step S450 selects probable delineators from among detected objects as the step S410 in FIG. 6 does.

The step S452 is subsequent to the step S450. The step S452 calculates predicted transverse positions Xcross of the probable delineators given by the step S450 as the step S414 in FIG. 6 does.

The step S454 follows the step S452. Among probable delineators in the left-hand side of the road, the step S454 removes one or ones each corresponding a predicted transverse position Xcross having a relatively great absolute value. Specifically, the step S454 checks the signs of the predicted transverse positions Xcross given by the step S452. The step S454 forms negative predicted transverse positions Xcross into a group corresponding to the left-hand side of the road. The step S454 finds the smallest Xcross (MIN) of the absolute values of the negative predicted transverse positions Xcross. The step S454 searches the negative predicted transverse positions Xcross for one or ones each satisfying the following condition.

$$|Xcross|>|Xcross(MIN)|+2.0m \quad (11)$$

The step S454 excludes a probable delineator or delineators, corresponding to negative predicted transverse positions Xcross satisfying the above-indicated condition (11), from consideration concerning road-shape recognition. In other words, the step S454 selects only left-hand probable delineators each corresponding to a predicted transverse position Xcross having a relatively small absolute value. The selected probable delineators will be considered in the road-shape recognition.

The step S456 is subsequent to the step S454. Among probable delineators in the right-hand side of the road, the step S456 removes one or ones each corresponding a predicted transverse position Xcross having a relatively great absolute value. Specifically, the step S456 checks the signs of the predicted transverse positions Xcross given by the step S452. The step S456 forms positive predicted transverse positions Xcross into a group corresponding to the right-hand side of the road. The step S456 finds the smallest Xcross(MIN) of the positive predicted transverse positions Xcross. The step S456 searches the positive predicted transverse positions Xcross for one or ones each satisfying the above-indicated condition (11). The step S456 excludes a probable delineator or delineators, corresponding to positive predicted transverse positions Xcross satisfying the above-indicated condition (11), from consideration concerning the road-shape recognition. In other words, the step S454 selects only right-hand probable delineators each corresponding to a positive predicted transverse position Xcross having a relatively small value. The selected probable delineators will be considered in the road-shape recognition.

The step S458 follows the step S456. The step S458 implements the road-shape recognition as the step S416 in FIG. 6 does. Specifically, the step S458 detects the right-hand and left-hand edges of the present lane (the road), and recognizes the shape of the present lane (the road) in response to the probable delineators selected by the steps S454 and S456. After the step S458, the current execution cycle of the program segment ends.

The steps S454 and S456 may use the smallest values Xcross(MIN) which occur during the last 3-second time interval.

The steps S454 and S456 correspond to minimum position detecting means (smallest position detecting means).

What is claimed is:

1. A road-shape recognition apparatus comprising:
   a radar device for emitting a detection wave ahead of a vehicle, and detecting objects in response to echoes of the emitted detection wave;
   reflector detecting means for detecting reflectors among the objects detected by the radar device, the reflectors being located along a road;
   reflector-row extracting means for, in cases where there are a plurality of rows of the reflectors detected by the reflector detecting means in one side of the vehicle, extracting one from among the reflector rows; and
   road-shape recognizing means for recognizing a shape of the road on the basis of the reflector row extracted by the reflector-row extracting means.

2. A road-shape recognition apparatus as recited in claim 1, wherein the reflector-row extracting means comprises means for extracting one, which exists in a specified region with respect to the vehicle in a width-wise direction of the vehicle, from among the reflector rows.

3. A road-shape recognition apparatus as recited in claim 2, wherein the reflector-row extracting means comprises means for setting the specified region in accordance with a width of a lane along which the vehicle is traveling.

4. A road-shape recognition apparatus as recited in claim 2, wherein the reflector-row extracting means comprises:
   position estimating means for estimating positions, in the width-wise direction of the vehicle, of the reflectors detected by the reflector detecting means which occur after a lapse of an arbitrary time;
   minimum position detecting means for detecting, among the positions estimated by the position estimating means, a minimum position corresponding to a position nearest to the vehicle; and
   means for setting the specified region on the basis of the minimum position detected by the minimum position detecting means.

5. A road-shape recognition apparatus as recited in claim 4, wherein the road-shape recognizing means comprises means for recognizing the shape of the road on the basis of the reflector row extracted by the reflector-row extracting means and the positions estimated by the position estimating means.

6. A road-shape recognition apparatus as recited in claim 4, wherein the position estimating means comprises means for estimating the positions, in the width-wise direction of the vehicle, of the reflectors detected by the reflector detecting means which occur after the lapse of the arbitrary time on the basis of relative speeds between the vehicle and the reflectors detected by the reflector detecting means.

7. A road-shape recognition apparatus as recited in claim 2, wherein the reflector-row extracting means comprises:
   position estimating means for estimating positions, in the width-wise direction of the vehicle, of the reflectors detected by the reflector detecting means which occur after a lapse of an arbitrary time;
   determining means for determining whether or not there are a plurality of the positions estimated by the position estimating means;
   lane-width calculating means for, in cases where the determining means determines that there are a plurality of the positions estimated by the position estimating means, calculating a lane width on the basis of an interval between the estimated positions; and
   means for setting the specified region on the basis of the lane width calculated by the lane-width calculating means.

8. A road-shape recognition apparatus as recited in claim 1, further comprising:
   at least one of 1) a steering sensor for detecting a steering angle of the vehicle and 2) a yaw rate sensor for detecting a yaw rate of the vehicle;
   curvature-radius calculating means for calculating a curvature radius of a course, along which the vehicle is traveling, from at least one of 1) the steering angle detected by the steering sensor and 2) the yaw rate detected by the yaw rate sensor;
   position converting means for converting positions, in a width-wise direction of the vehicle, of the reflectors detected by the reflector detecting means into positions in the width-wise direction of the vehicle which occur on the assumption that the vehicle is traveling along a straight road; and means provided in the reflector-row extracting means for extracting one, which exists in a specified region with respect to the vehicle in the width-wise direction of the vehicle, from among the reflector rows in response to the positions resulting from the conversion by the position converting means.

9. A road-shape recognition apparatus as recited in claim 1, wherein the reflector detecting means comprises means for detecting the reflectors among the objects detected by the radar device on the basis of relative speeds between the vehicle and the objects and sizes of the objects.

10. A preceding-vehicle detection apparatus for a subject vehicle, comprising:

the road-shape recognition apparatus of claim 1;

relative position detecting means for detecting positions of the objects detected by the radar device relative to the subject vehicle;

lane-sameness probability calculating means for calculating a probability for each of the objects that the object and the subject vehicle are on a same lane on the basis of the road shape recognized by the road-shape recognizing means and the relative position detected by the relative position detecting means; and preceding-vehicle detecting means for detecting a preceding vehicle with respect to the subject vehicle among the objects in response to the probabilities calculated by the lane-sameness probability calculating means.

11. A computer program for recognizing road shapes and being tangibly embodied in a computer readable medium, the computer program comprising a computer methodology of:

processing received signals indicative of detected objects to recognize reflectors among the detected objects, the reflectors being located along a road;

in cases where there are a plurality of rows of the detected reflectors on one side of a vehicle, extracting a reflector row from among the reflector rows; and recognizing a shape of the road on the basis of the extracted reflector row.

* * * * *